Oct. 28, 1958  J. A. STOKES  2,858,071
ARRANGEMENT FOR COMPUTING THE TOTAL
DEFLECTION OF A STYLUS
Filed Jan. 16, 1956  3 Sheets-Sheet 1
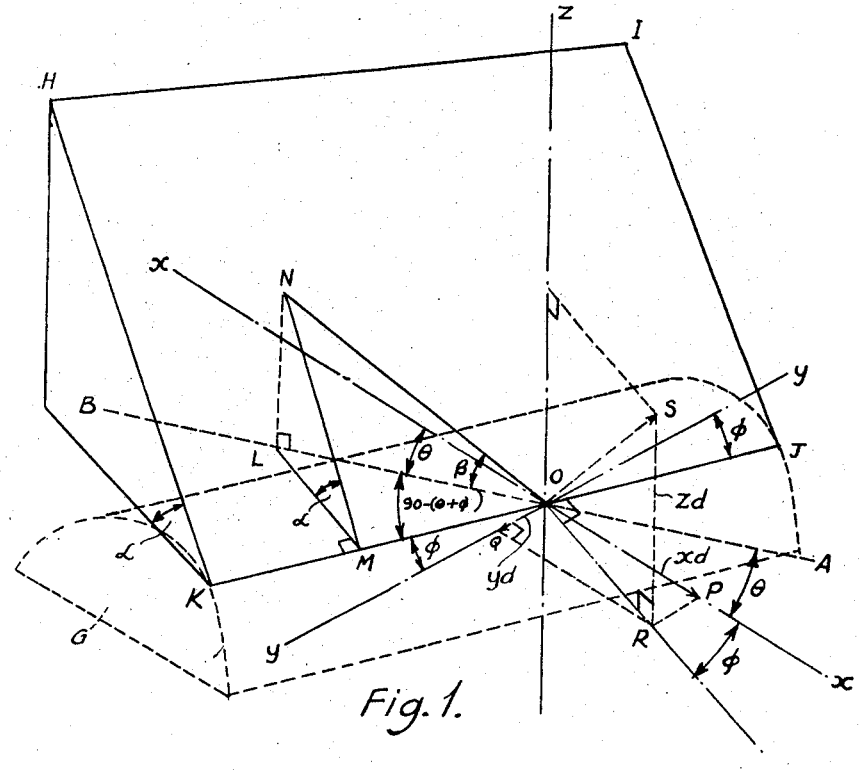
Fig. 1.
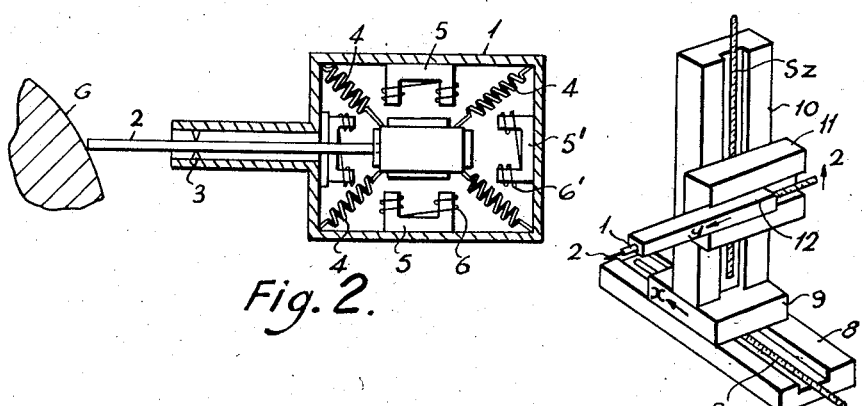
Fig. 2.
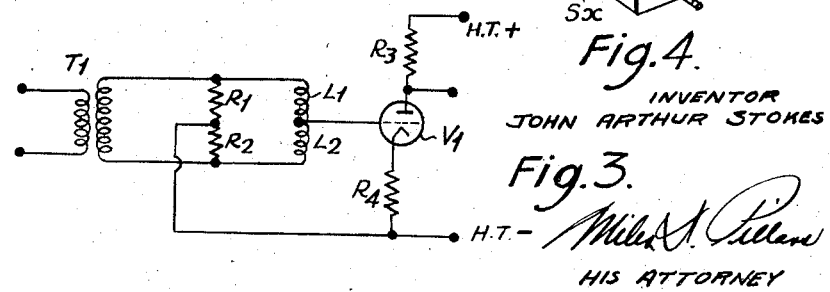
Fig. 4.
Fig. 3.
INVENTOR
JOHN ARTHUR STOKES
HIS ATTORNEY

INVENTOR
JOHN ARTHUR STOKES
HIS ATTORNEY

Oct. 28, 1958

J. A. STOKES 2,858,071

ARRANGEMENT FOR COMPUTING THE TOTAL
DEFLECTION OF A STYLUS

Filed Jan. 16, 1956

INVENTOR
JOHN ARTHUR STOKES
By Miles A. Pillans
HIS ATTORNEY

United States Patent Office 2,858,071
Patented Oct. 28, 1958

2,858,071

ARRANGEMENT FOR COMPUTING THE TOTAL DEFLECTION OF A STYLUS

John Arthur Stokes, Rugby, England

Application January 16, 1956, Serial No. 559,432

3 Claims. (Cl. 235—61)

This invention relates to the contour machining of articles the co-ordinates of the surface of which with respects to three mutually perpendicular planes may vary from point to point. In particular the invention is concerned with a contour tracing apparatus by which the contours of a model of a required article can be traced, with the intention that a machine tool or other such device, arranged to follow the tracing movements of the apparatus in any known manner, will by doing so reproduce the contours on a workpiece.

Contour tracing apparatus is known in which a tracing head capable of being driven independently along two mutually perpendicular axes carries a tracing stylus which in turn is deflectable with respect to the tracing head in two mutually perpendicular directions parallel to the plane containing the axes of movement of the tracing head. The apparatus is operated in a succession of tracing strokes during each of which the tracing head is moved so that the stylus traces a surface contour of the model along the line of intersection between the model and a fixed plane parallel to that already mentioned. The engagement of the stylus with the model causes deflection of the stylus in this fixed plane (which may be termed the contouring plane) in a direction substantially normal to the line of intersection at the point of contact between the stylus and model, except insofar as the normality may be affected by friction effects. Any change in the direction of stylus deflection, resulting from a change of direction in the line of intersection due to a bend in the contour being traced, is arranged to effect a corresponding change in the direction of travel of the tracing head (namely by modifying its relative rates of motion along its two axes) in such manner as to maintain the stylus in engagement with the model along said line.

Instead of the tracing head of such apparatus being movable, the tracing head may alternatively remain stationary and the model be caused to move relatively thereto; likewise there may be combined movement of the tracing head and model such as to produce the required relative movements of the one with respect to the other.

Since the orientation of the contouring plane for each tracing stroke is fixed in this known apparatus, the apparatus may be considered as being effectively two-dimensional in its operation. However, the shape of many articles which it might be desirable to machine under the control of a contour tracing apparatus operating in conjunction with a model of the article is such that it would be of advantage to be able to select the orientation of the contouring plane at will for each tracing stroke: the direction of travel of the tracing head and stylus and thus of a following machine tool would not then be restricted to a fixed plane but could be in any direction in space; that is, the operation would be effectively three-dimensional.

It is therefore an object of the present invention to provide a contour tracing apparatus which can operate in this manner.

To this end the invention disclosed in my copending application Serial No. 482,822 filed January 19, 1955, now Patent No. 2,837,707 of which the present application is a continuation-in-part, provides in one aspect thereof contour tracing apparatus including a tracing head, a stylus carried by the tracing head for engaging and tracing the surface of a model, said stylus being universally deflectable with respect to the tracing head, means for effecting independent relative motions between the tracing head and model along three mutually perpendicular axes respectively, and means for controlling said relative motions to constrain the stylus to trace the surface of the model along a course which as projected into a reference plane including two of said axes makes a desired angle with one of these two axes, said last mentioned means being effective, in dependence upon the desired value of said angle and upon the deflection of the stylus, to control the relative rates at which said motions are effected to produce a resultant motion appropriate to the stylus tracing the surface model along the desired course at a speed substantially independent of the shape of the model.

In order that the relative rates of motion along the three axes may be controlled in the desired manner there may be provided for the tracing apparatus, in accordance with another aspect of said invention, a computing arrangement comprising means for obtaining a cyclically varying direction signal the phase of which with respect to a reference phase signal represents the slope with respect to the reference plane of the line of intersection between the model and the instantaneous contouring plane at the point of contact between the stylus and model, means for applying to said direction signal a phase correction dependent on divergence of the total stylus deflection from a given value, means capable of providing three signals proportional to respective maximum values of relative velocity between the tracing head and model along the three axes, said maximum values for the axes in the reference plane being in the ratio appropriate to their resultant lying in the contouring plane, and means for deriving from these three signals as a function of the corrected direction signal respective control signals proportional to the actual velocities at which relative motion between the tracing head and model has to be effected along the three axes in order to maintain the stylus in contact with the model along the required course. These control signals may then be used directly for automatically effecting the required motions of the tracing head. Likewise they may be used either directly or from recordings thereof to control the motions of a contouring machine in such manner that the forming tool on such machine will fashion a workpiece to the shape of the traced model.

The term instantaneous contouring plane as used above denotes the plane which, extending perpendicularly to the reference plane, either includes the projected tracing course, or, where such course is not linear, is tangential to the tracing course at the point of contact of the stylus and model.

In such computing arrangement the means for obtaining the direction signal representing by its phase the slope of the line of intersection between the model and the contouring plane may be arranged to compute the angle ($\beta$) of the slope from the co-ordinate components ($x_d$, $y_d$, $z_d$) of the stylus deflection along the three axes, taken in conjunction with the angles ($\phi$ and $\theta$ respectively) made with one of said axes in the reference plane by the direction of the component of stylus deflection measured in that plane on the one hand and by the contouring plane on the other hand.

The required phase correction of this direction signal in dependence on the divergence of the total stylus deflection from a given value may be effected by applying the direction signal to a phase shifter to which is also applied a phase shift control voltage derived as the difference between a fixed voltage and a signal proportional to the total stylus deflection. The present invention is concerned with an arrangement for deriving this latter signal proportional to stylus deflection.

According to the present invention an arrangement for computing the total deflection of a deflectable stylus from the components of its deflection along three mutually perpendicular axes, comprises variable alternating current impedance means respectively responsive to said components of the stylus deflection, means for energizing in phase quadrature with each other said impedance means responsive to the components of stylus deflection along two of said axes, thereby to obtain output signals in phase quadrature with each other and proportional to these components, means for algebraically adding said signals and for rectifying their sum, means for deriving from the rectified addition signal an A. C. signal of proportionate amplitude and reference phase, means for energizing in quadrature phase the impedance means responding to the component of stylus deflection along the third axis thereby to obtain an output signal of corresponding phase and of magnitude proportional to that component, and means for algebraically adding this latter output signal to said A. C. signal of reference phase, whereby to obtain a resultant A. C. signal of amplitude proportional to the total deflection of the stylus.

The present invention will be more fully understood from the following description of the accompanying drawings in which:

Fig. 1 is a diagram illustrating the directional relationship between various vectors involved in the operation of a contour tracing apparatus according to the invention disclosed in my said copending application Serial No. 482,822;

Fig. 2 is a schematic illustration in axial section of a tracing head which can be used in such tracing apparatus;

Fig. 3 illustrates a circuit for deriving deflection signals from the stylus;

Fig. 4 illustrates a mounting arrangement for the tracing head permitting the required movement thereof along said three axes;

Figure 5:
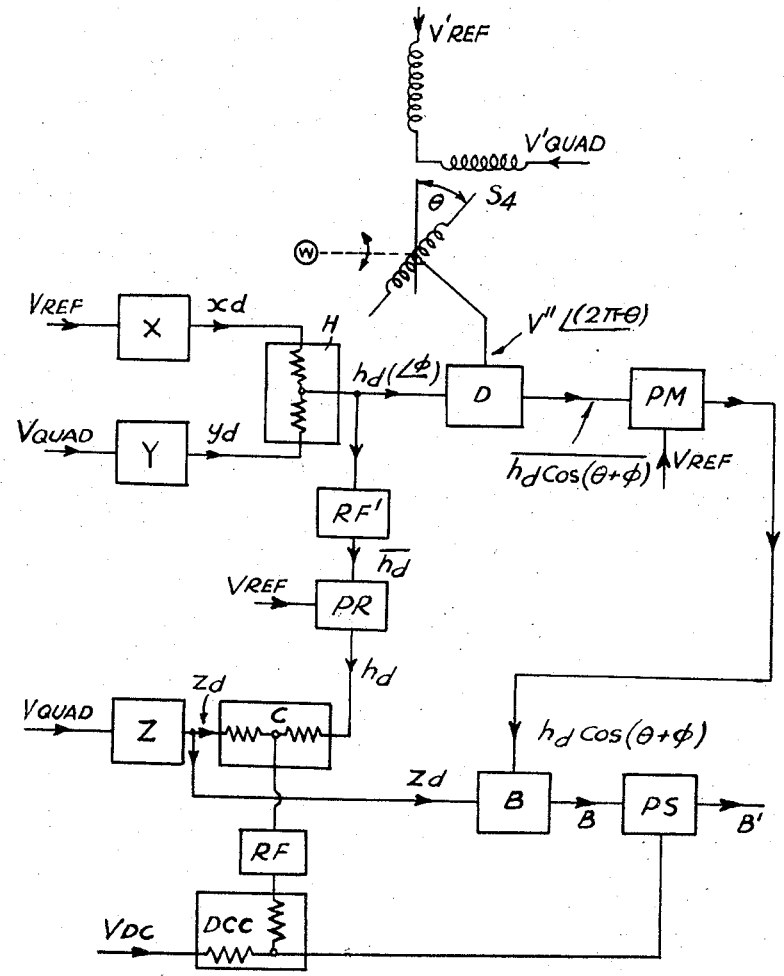
Fig. 5 illustrates diagrammatically an arrangement for computing the required direction of travel ($\beta$) of the tracing head, said arrangement incorporating the present invention.

In Fig. 1, in which the point O represents the instantaneous point of contact between a model G to be traced and the tracing head stylus (not shown), the various vector directions are referred to three mutually perpendicular axes $x$, $y$ and $z$ corresponding to the axes of movement of the tracing head itself. The plane HIJK, inclined at an angle $\alpha$ to the $xy$ (reference) plane and intersecting it along a line JK which passes through the point O at an angle $\phi$ to the $y$ axis, represents the tangent plane to the surface of the model G at the point O. It follows, therefore, that in the absence of friction effects the stylus will be deflected perpendicularly to the plane HIJK. Let the amplitude of the deflection be OS and the components of the amplitude of deflection along the axes $x$, $y$ and $z$ be $OP=x_d$, $OQ=y_d$ and $RS=z_d$. It will be apparent that OR is perpendicular to JK, hence $$\widehat{POR}=\phi$$

Assuming now that a contour is to be followed along the surface of the model such that the course as projected on to the $xy$ plane remains constant and makes an angle $\theta$ with the $x$ axis, then the required path is the line of intersection of the model with a plane which extending perpendicularly to the $xy$ plane, passes through the origin O and intersects the $xy$ plane along a line AB making an angle $\theta$ with the $x$ axis; this perpendicular plane including the line AB thus constitutes the so-called contouring plane. In the following the $xy$ plane will be taken as being horizontal and the contouring plane accordingly vertical. These perpendicular planes may, of course, have any desired position in practice.

At the point O, the direction of the required path will be along the line ON, representing the line of intersection of the HIJK plane and the contouring plane through AB. If a perpendicular NL be dropped from N to the $xy$ plane, then the point L at which it meets that plane will lie on the line AB, that is, the line OL will make an angle $\theta$ with the $x$ axis. Also if a line LM be drawn in the $xy$ plane perpendicular to the line JK so that $$\widehat{LMK}=90°$$

and $$\widehat{NLM}=90°$$

then $$\widehat{NML}=\alpha$$

the inclination of the plane HIJK.

Now as the angle between OL and the $x$ axis $=\theta$ and the angle between OM and the $y$ axis $=\phi$:

$$\widehat{LOM}=(90°-(\theta+\phi))$$

and $$LM=OL \sin(90°-(\theta+\phi))=OL \cos(\theta+\phi)$$

But $$NL=LM \tan \alpha$$
$$\therefore NL=OL \cos(\theta+\phi) \tan \alpha$$

or $$\frac{NL}{OL}=\cos(\theta+\phi) \tan \alpha$$

Now the desired direction of travel lies along the line ON, that is along a line in the vertical, or contouring, plane through AB. This line makes an angle $\beta$ with the $xy$ plane, that is $$\widehat{NOL}=\beta$$

and $$\tan \beta=\frac{NL}{OL}=\cos(\theta+\phi) \tan \alpha$$

If the motion of the stylus relative to the model, namely the motion imparted to the stylus by movement of the tracing head as distinct from deflection of the stylus relatively to the tracing head, is compounded of velocities $x'$, $y'$, and $z'$ measured parallel to the $x$, $y$ and $z$ axes respectively, then to constrain the motion to the vertical plane through AB, $$\frac{y^1}{x^1} \text{ must equal } \tan \theta$$

Hence the horizontal component of motion can be considered as a single vector $h'$ subtending an angle $\theta$ with the $x$ axis, the amplitude $h'$ being the vector sum of $x'$ and $y'$.

The resultant motion is thus compounded of the horizontal component $h'$ and vertical component $z'$ such that $$\frac{z'}{h'}=\tan \beta$$

If the speed of progression of the stylus along the line ON is given by $v$ then $$z'=v \sin \beta, h'=v \cos \beta$$

but $$y' = h' \sin \theta \text{ and } x' = h' \cos \theta$$
$$\therefore y' = v \cos \beta \sin \theta \text{ and } x' = v \cos \beta \cos \theta$$

Suppose now that a system capable of computing and setting up the desired $x$, $y$ and $z$ velocities were set up with an initial amplitude of stylus deflection equal to "$d$," it being recalled that the deflection of the stylus with respect to the tracing head will at all times be substantially normal to the model surface at its point of engagement therewith. Then the stylus would move along the line ON, providing that the actual velocities $x'$, $y'$ and $z'$ were absolutely accurate. Any error in these quantities would cause the amplitude of stylus deflection to increase or decrease progressively, without however changing the direction of stylus deflection and therefore without resulting in any change in the direction of travel such as would tend to restore the stylus deflection to its initial value. Hence if the stylus is to remain deflected by a substantially constant amount, the amplitude "$d$" must be measured, and a correction applied to the direction of stylus travel if the amplitude "$d$" departs from its desired value. Such correction in response to change of total stylus deflection is also important in enhancing the rapidity of response of the tracing apparatus, particularly when negotiating an abrupt corner. As will be appreciated on reaching such a corner not only will the direction of stylus deflection change, resulting in a corresponding change in the direction of travel of the tracing head, but the magnitude of deflection will also temporarily change to such an extent that the direction of travel tends to be over-corrected, with the overall result that the direction of travel is in fact changed very rapidly. The correction can with advantage be applied to the angle $\beta$, since this angle is measured in a plane perpendicular to the $xy$ plane and variation of the angle will thus not vary the direction of contouring $\theta$. The corrected value of $\beta$ will be termed $\beta'$.

The complete computing arrangement has then to perform the following functions:

(a) Compute an angle $\beta$ from the formula $$\tan \beta = \cos (\theta + \phi) \tan \alpha$$

where $\theta$ is the predetermined direction of contouring as selected manually by the operator or set up by other means, $\phi$ is the angle included between the $y$ axis and the line of intersection of the $xy$ plane and tangent plane to the model at the point of contact, and $\alpha$ is the inclination of this tangent plane to the $xy$ plane.

(b) Measure the total deflection "$d$" of the stylus, and if it varies from a predetermined value, superimpose a variation on the angle $\beta$ obtained from (a) to give a corrected value $\beta'$.

(c) Accept an independent signal $v$, proportional to the desired velocity along the line of intersection of the model and the contouring plane, and resolve it into two components $v \cos \theta$ and $v \sin \theta$.

(d) Derive from $v$, $v \cos \theta$ and $v \sin \theta$ respective output signals of $v \sin \beta'$, $v \cos \theta \cos \beta'$ and $v \sin \theta \cos \beta'$ respectively.

The basic information required by the computer concerning the components of stylus deflection $x_d$, $y_d$, $z_d$ along the three axes $x$, $y$, $z$, can be obtained by employing a tracing head incorporating for each of three mutually perpendicular axes corresponding to the axes $x$, $y$, $z$ at least one coil the inductance of which depends on the magnitude of the component of stylus deflection along the appertaining axis. Such coils will be termed the $x$, $y$ and $z$ coils in accordance with the particular component of stylus deflection to which they respond. Thus referring to Fig. 2 the tracing head may comprise a body 1 and stylus 2, the latter being supported by a bearing 3 and a spring system 4. The bearing 3 is formed so that the stylus can pivot about it in response to transversely applied pressure and can slide into or out of the body 1 in response to axially applied pressure, the spring system 4 being preferably designed so that the mechanical stiffness to deflections of the stylus in any direction, as measured at the stylus tip, is substantially constant. The body 1 carries within it a pair of U-shaped magnetic cores 5 disposed diametrically opposite each other with respect to the stylus axis and carrying respective windings 6 constituting induction coils. A similar pair diametrically opposite cores and coils (not seen in Fig. 2) is disposed at right angles to this first pair, and yet another pair of U-shaped cores 5' with respective coils 6' is disposed within the body 1 at axially displaced positions, the cores 5' nearer the end of the body 1 from which the stylus projects being suitably formed to pass the stylus without interfering with deflection thereof. The inner end of the stylus 2 carries packets of magnetic laminations 7 which co-operate with the inwardly directed limbs of the several magnetic cores so that deflection of the stylus in the direction from one of the cores of any pair towards the other (corresponding to deflection in one or other of the axes $x$, $y$ and $z$) causes a differential change in inductance of the two coils of that pair.

Signals proportional to the components of stylus deflection along the three axes can then be obtained from respective A. C. bridge circuits each including the pair of tracing head coils provided for the axis to which that circuit pertains. Thus referring to Fig. 3 each of the three bridge circuits required may comprise two equal resistive arms R1 and R2 and two inductive arms L1 and L2, the latter being constituted by the relevant pair of coils in the tracing head. The bridge is energized over a transformer T1 and the bridge output, appearing between the junction point of the resistive arms R1 and R2 and that of the inductive arms L1 and L2, is applied to a thermionic valve amplifier comprising in usual manner a thermionic valve V1, an anode load resistor R3 and a cathode bias resistor R4. As will be readily appreciated, differential change of inductance in the branches L1 and L2 will produce a corresponding change in output at the anode of the valve V1. Thus if the stylus is deflected in any direction—which will cause differential inductance change in at least one of the pairs of tracing head coils, depending on what are the components of stylus deflection along the three axes—the bridge circuit including such pair of coils will produce an output which is proportional to the component of stylus deflection along the axis to which that pair of coils appertains, the phase of the output depending on the phase of the supply energising the bridge and being reversed for opposite senses of that component of the stylus deflection. With the exception of the tracing head coils themselves the components of the three bridge circuits, connected to the coils over suitable leads, may be accommodated in, for example a control cubicle (not shown) housing also the components for the other circuitry required.

To permit the required movement of the tracing head independently along the three axes, it may be carried by a mounting arrangement such as that illustrated diagrammatically in Fig. 4 in which a horizontal slide 8 carries a saddle 9 supporting a vertical slide 10. This slide 10 in turn carries a cross-slide 11 in which can slide horizontally and perpendicularly to the slide 8 a holder 12 at the end of which is mounted the tracing head 1 with the stylus 2 projecting therefrom. Lead screws Sx, Sy and Sz, having respective, independent drive mechanisms therefor (not shown in Fig. 4 but discussed in more detail later in connection with Fig. 10) permit the tracing head to be moved independently along each and any of the axes $x$, $y$ and $z$.

Dealing now with the various functions which, as set forth above, the computing arrangement has to fulfill, the measurement of the total deflection of the stylus (function (b)) can be effected by deriving from the three mutually perpendicular components $x_d$, $y_d$, $z_d$, of the stylus deflection a value $$\sqrt{x_d^2+y_d^2+z_d^2}$$

To this end, if the $x$ and $y$ coils of the tracing head are excited in phase quadrature and the resulting outputs (for example from respective bridge circuits such as that of Fig. 3) are added together, a resultant signal will be obtained proportional in amplitude to $$h_d = \sqrt{x_d^2+y_d^2}$$

and of phase $\phi$ with respect to the phase of the excitation of the $x$ coils. If this resultant signal can be arranged to be in phase quadrature with the output from the $z$ coils in the tracing head then their sum will give a resultant signal of amplitude proportional to $$\sqrt{h_d^2+z_d^2}=\sqrt{x_d^2+y_d^2+z_d^2}$$

as required. The necessary phase relationships can be obtained in two general ways:

(1) By varying the phase of the excitation to the $x$ and $y$ coils of the tracing head or the phase of the excitation to the $z$ coils in such manner as to maintain the resultant $h_d$ and $z_d$ signals in phase quadrature, or (2) by maintaining all the coil excitations in fixed phase and subsequently shifting the $h_d$ or $z_d$ signal to give the quadrature relationship. It is with this latter method that the present invention is concerned.

Considering now function ($a$) referred to above a phase angle $\beta$ has to be produced such that $$\tan \beta = \tan \alpha \cos(\theta+\phi) = \frac{h \cos(\theta+\phi)}{Z} \left(\text{since } \tan \alpha = \frac{h}{z}\right)$$

This can be effected by adding together signals which have amplitudes proportional respectively to $h_d \cos(\theta+\phi)$ and to $z_d$ and are in phase quadrature with each other.

Thus a signal proportional to $z_d$ is required for both the functions ($a$) and ($b$). If the same $z_d$ signal is to be used for both, as would be convenient, then two other signals of magnitude proportional to $h_d$ and $h_d \cos(\theta+\phi)$ respectively are required each having the same phase, namely in quadrature with the $z_d$ signal.

An arrangement incorporating the present invention and fulfilling both of the functions ($a$) and ($b$) referred to will now be described in detail with reference to Fig. 5 in which the blocks X, Y and Z represent circuits, such for instance as that of Fig. 3, which respectively include the $x$, $y$ and $z$ coils of the tracing head and from which respective signals can be obtained the magnitudes of which are proportional to the components of stylus deflection $x_d$, $y_d$ and $z_d$ and the phase of each of which depends on that of the voltage supplied to the appertaining circuit.

Figure 6:
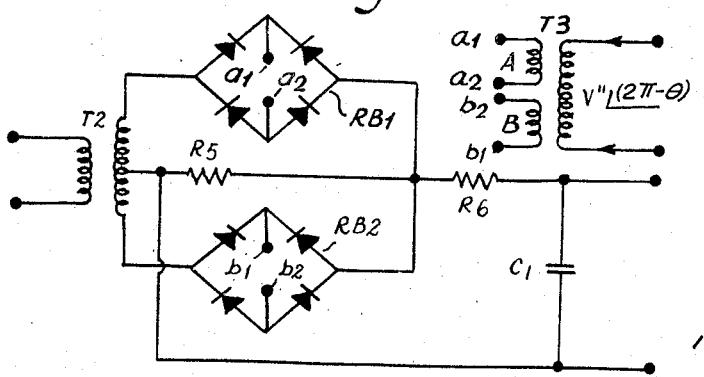
Figs. 6 and 7 illustrate respective circuits which may be employed in the arrangement of Fig. 5.

Referring now to Fig. 5 the circuit X is excited with a voltage $V_{REF}$ of reference phase and the circuit Y is excited by a voltage $V_{QUAD}$ in quadrature with $V_{REF}$. The signals proportional to $x_d$ and $y_d$ as derived by the circuits X and Y are therefore in phase quadrature and can be added together vectorially to give a resultant signal of amplitude proportional to $h_d$ and of phase angle $\phi$. This is done in a circuit H which may simply comprise two series-connected resistors receiving the $x_d$ and $y_d$ signals at their outer ends and giving the $h_d$ signal at their mid-point. The resultant $h_d$ signal is applied to a phase-conscious demodulator D to which is also applied a bias voltage of phase angle $(2\pi-\theta)$ so that an output will be obtained which is a D. C. signal of amplitude proportional to $h_d \cos(\phi+\theta)$. A suitable phase-conscious demodulator employing biased rectifier bridges is illustrated in Fig. 6.

Referring to this latter figure two rectifier bridges RB1, RB2 are connected in series with a common resistor R5 across respective halves of the secondary winding of a transformer T2 to the primary of which the $h_d$ signal is applied. The rectifiers in each bridge are all poled towards a corner of the bridge not directly connected to the transformer secondary or to the resistor R5 and between this corner and the diagonally opposite one is applied through a limiting resistor (not shown) a biasing voltage of phase $(2\pi-\theta)$ for one bridge and of opposite phase for the other bridge. These biasing voltages can be obtained from separate secondary windings A and B on transformer T3 the primary of which is fed with a voltage $V''$ of phase $(2\pi-\theta)$. As indicated in Fig. 5 this latter voltage may be obtained from a selsyn S4 the primary of this selsyn being fed with a polyphase supply $V'_{REF}$ and $V'_{QUAD}$ and the secondary being angularly adjustable by an operator manually or by other means to give the required phase angle $(2\pi-\theta)$ to the output.

Considering the rectifier bridge RB1, the bias voltage applied at the terminals $a1$ and $a2$ across one diagonal of the bridge will cause forward current flow through all the rectifiers in one half-cycle of the bias voltage but will back off the rectifiers in the opposite half-cycles. During each half-cycle of bias voltage in which forward current is flowing through the rectifiers in bridge RB1 they will present a low impedance to the voltage then appearing across the upper half of the secondary winding of transformer T2, this upper half being connected, through resistance R5, across the other bridge diagonal. Consequently a corresponding voltage will appear across the resistance R5. In the other half-cycles of bias voltage the rectifiers of the bridge RB1 are backed off and no voltage appears across R5 from this bridge. However since the bias voltage is applied to bridge RB2 in opposite phase, the rectifiers in this bridge, backed off while those in bridge RB1 are conductive, are themselves rendered conductive while those in RB1 are backed off, permitting the voltage appearing across the lower half of the secondary of T2 then to appear across resistance R5. If the input voltage to transformer T2 was in phase with the voltage applied to the bias transformer T3, the positive half-cycle of the input voltage would appear across the resistance R5 on one half-cycle of the bias voltage and the negative half-cycle would appear across the resistance, with inverted sign, on the other half-cycle of the bias; in other words full-wave rectification of the input voltage would be obtained. If the input voltage was in phase quadrature with the bias voltage the voltage appearing across the resistance R5 on each half-cycle of the bias voltage would correspond to the second half of, say, the positive half-cycle of the input voltage followed by the first half of the negative half-cycle, giving a zero mean voltage. Between these phase relationships the voltage appearing across the resistance R5 will have a D. C. component of value lying between zero and the full-wave rectification value and will have a magnitude proportional to the cosine of the phase angle between the input voltage and the bias voltage. Therefore by including in the circuit smoothing components such as R6 and C1, a D. C. output signal will be obtained which is a direct measurement of the cosine of that phase angle, this signal being also proportional to the input voltage. Consequently if the bias and input voltages have phase angles of $(2\pi-\theta)$ and $\phi$, respectively, and the input voltage has a magnitude $h_d$, as they have for the demodulator D in Fig. 5, the output will be proportional to $h_d \cos(\theta+\phi)$ as required.

Figure 7:
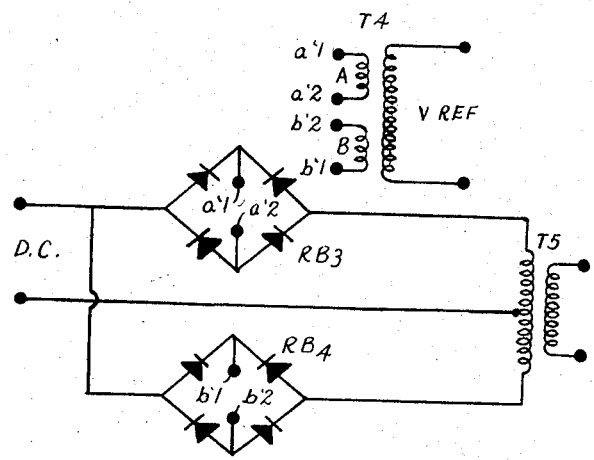

The D. C. output from the demodulator D (Fig. 5) is applied to a modulator circuit PM which receives also a voltage $V_{REF}$ of reference phase and gives an alternating output which has a magnitude proportional to the D. C. input thereto—in this case proportional to $h_d \cos(\theta+\phi)$—and is in time phase with the voltage $V_{REF}$. A possible circuit for PM is illustrated in Fig. 7, which is somewhat similar to that of Fig. 6, except that the input is D. C. and is applied directly across the bridge diagonals, while the output is taken from transformer T5. In this demodulator, a biased rectifier bridge RB3 is connected between one side of the D. C. input and one end of the primary winding of a transformer T5 while another biased rectifier bridge RB4 is connected between the same side of the D. C. input and the oposite end of the transformer primary, the other side of the D. C. input being directly connected to the centre of the transformer primary. A. C. bias voltages for the rectifier bridges RB3, RB4 are applied at the terminals $a1$, $a2$ and $b1$, $b2$ respectively from separate secondary windings A and B of a transformer T4 the primary of which is fed with a voltage ($V_{REF}$) of reference phase. As indicated by the terminal references the bias voltages as applied to the rectifier bridges are in opposite phase so that the two bridges will be rendered conductive on alternate half cycles of the reference phase voltage. When bridge RB3 is conductive the D. C. input voltage is applied across the upper half of the primary of transformer T5, resulting in a voltage of proportionate amplitude being induced in the secondary with one polarity, whereas when the bridge RB4 is conductive, the D. C. input is applied across the lower half of the transformer secondary, again resulting in a voltage of proportionate amplitude being induced in the secondary but this time with the opposite polarity. Accordingly as the bias voltages render the rectifier bridges RB3 and RB4 alternately conductive, so an output is obtained from the secondary of the transformer T5 which alternates in phase with the reference voltage between values of opposite polarity each proportional to the D. C. input. This output, which will thus have a generally rectangular waveform can then be filtered to give a substantially sinusoidal voltage of the required proportionate amplitude and reference phase.

As will be appreciated other circuits may be employed for the circuit PM of Fig. 5 as may be most suitable in consideration of the supply frequency and the tolerance on the supply frequency.

It will now be apparent that the signal obtained from the circuit PM has an amplitude $h_d \cos(\theta+\phi)$ and is in reference phase.

The circuit Z producing the $z_d$ signal corresponding to the $z$ vector of the stylus deflection is fed with the voltage $V_{QUAD}$ in time phase quadrature with the voltage $V_{REF}$, with the result that the $z_d$ signal derived from the circuit Z is in quadrature with the reference phase. The outputs from the circuits PM and Z are added together in a circuit B which, like the circuit H, may simply comprise two series-connected resistors. A resultant signal is therefore obtained from the circuit B which is displaced with respect to the $z_d$ signal by an angle ($\lambda$) such that $$\tan \lambda = \frac{h_d \cos(\theta+\phi)}{z_d}$$

It is known from Fig. 1, however, that $$\frac{h_d}{z_d} = \tan \alpha$$

$$\therefore \tan \lambda = \tan \alpha \cos(\theta+\phi)$$

This expression is identical with that for $\tan \beta$, and therefore the angle $\lambda$ which has been derived is identical with the angle $\beta$, which in the absence of friction would be the angle of the desired direction of travel of the stylus with respect to the $xy$ plane. The angle $\beta$ has thus been derived in terms of a phase angle so that function ($a$) above has been fulfilled.

Having obtained a signal of phase angle $\beta$, it is now necessary to correct this phase angle for deflections of the stylus due to extraneous causes, such as friction, to fulfil function ($b$) above. The total deflection of the stylus is given by $$\sqrt{x_d^2 + y_d^2 + z_d^2} = \sqrt{h_d^2 + z_d^2}$$

Since the $h_d$ signal obtained from the circuit H in Fig. 5 is of phase $\phi$ it cannot be directly added to the $z_d$ signal to give a signal proportional to the total stylus deflection. In order, therefore, to obtain this latter signal, and in accordance with the present invention, the $h_d$ signal from unit H is rectified in RF' to give a D. C. signal of amplitude proportional to $h_d$. This D. C. signal is applied to a modulator circuit PR which receives also the voltage $V_{REF}$ of reference phase and produces an output of magnitude proportional to the D. C. signal and of reference phase; this circuit PR fulfils a similar function to the circuit PM and can therefore be similarly constituted, for instance by a circuit such as that illustrated in Fig. 7. Since the output from the circuit PR is of amplitude $h_d$ and of reference phase it can now be added to the $z_d$ signal to produce a signal proportional to total stylus deflection. This addition is effected in a circuit C (which again like circuit H may simply comprise two series resistors) and the resultant is rectified in RF to produce a D. C. signal proportional to the stylus deflection. This D. C. signal is then compared, as through series-connected resistors in a circuit DCC, with a fixed D. C. reference signal $V_{DC}$ representing a desired value of stylus deflection. If the stylus deflection departs from its desired value, due for instance to friction effects, an error signal representing the extent of the departure is obtained from this comparison, and such error signal is then used, as by applying it to control a phase shifting unit PS, to superimpose a correction on the angle $\beta$ in any convenient manner, several ways of doing this being known from two-dimensional profiling systems. The output from the phase shifter PS therefore has the corrected phase $\beta'$ as required according to function ($b$) above.

Figure 8:
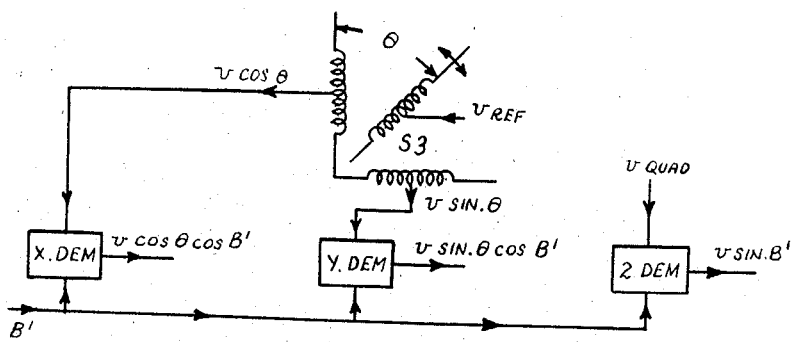
Fig. 8 illustrates an arrangement for computing from the output of the arrangement of Fig. 5 the relative rates of motion required by the tracing head along the three axes.

In accordance with the required function ($c$), it is now required to accept an independent signal $v$, proportional to the desired velocity along the line of intersection of the model and the contouring plane and resolve it into two components $v \cos \theta$ and $v \sin \theta$. Referring to Fig. 8 this is done by means of a selsyn or similar device S3 which has a single coil on its rotor and two coils in quadrature on its stator. A voltage $v_{REF}$ of amplitude $v$ and reference phase is applied to the rotor coil and an angle $\theta$ is set up between this latter coil and one of the stator coils with the result that the outputs from the stator coils will have magnitudes equal to $v \cos \theta$ and $v \sin \theta$ respectively, both being of reference time phase. The positioning of the rotor may be effected by mechanically coupling it to the rotor of the selsyn S4 in Fig. 5.

The signal of time phase $\beta'$ derived by the computer of Fig. 5 is fed as a bias voltage to three similar demodulators, the $x$ demodulator $X_{DEM}$, the $y$ demodulator $Y_{DEM}$ and $z$ demodulator $Z_{DEM}$, each of which may be similar to that illustrated in Fig. 7. To the $x$ demodulator is applied the voltage $v \cos \theta$ of reference phase, to the $y$ demodulator the voltage $v \sin \theta$ of reference phase, and to the $z$ demodulator a voltage $v_{QAUD}$ which is in time phase quadrature with the voltage $v_{REF}$ and of equal amplitude. As a result the following outputs are obtained, namely:

$v \cos \theta \cos \beta'$ from the $x$ demodulator $v \sin \theta \cos \beta'$ from the $y$ demodulator and $v \sin \beta'$ from the $z$ demodulator.

These outputs are thus proportional to the required speeds in the $x$, $y$ and $z$ directions respectively and can be fed in a conventional manner to provide reference voltages for the three feed-drive mechanisms for the tracing head mounting.

Figure 9:
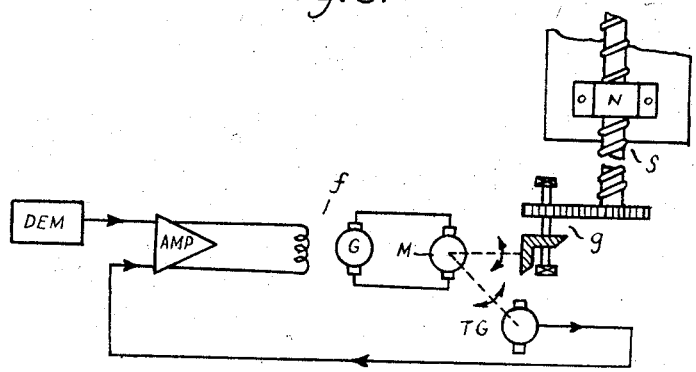
Fig. 9 illustrates a drive mechanism by which the required motion along an axis can be imparted to the tracing head.

Thus referring to Fig. 9 which shows one of the feed-drive mechanisms, the others being similar, the output from the relevant demodulator DEM, namely the $x$, $y$ or $z$ demodulator as the case may be, is applied to an amplifier AMP the output of which energises a field winding $f$ on a generator G feeding a motor M. This motor M is coupled through suitable gearing $g$ to a lead screw S which co-operates with a nut N on the appropriate part of the tracing head mounting so as to impart motion to the tracing head in the required direction. The lead screw S corresponds of course to the lead screw $S_x$, $S_y$ or $S_z$ (as the case may be) in Fig. 4. The motor M also drives a tachometer generator TG to provide a velocity feedback to the input of the amplifier AMP, this feedback signal being compared with the output from the demodulator and any difference being effective to modify the excitation of the field winding $f$ in such direction as to adjust the motor speed in the direction to reduce such difference. Thus the drive mechanism illustrated in Fig. 9 operates as an error actuated servo-mechanism.

By thus controlling the three feed drive mechanisms for the tracing head mounting in accordance with the outputs from the $x$, $y$ and $z$ demodulators respectively, the tracing head will be driven along the $x$, $y$ and $z$ directions at the required relative speeds for producing a resultant motion such that the stylus will trace a contour of the model along the course set up by the operator's selection of the angle $\theta$. Having effected one controlled tracing stroke in this manner, a subsequent stroke can be effected, along a course somewhat displaced with respect to the first, by initially offsetting the starting position of the tracing head and/or by selectively adjusting the angle $\theta$ to a different value, in which latter case the course followed in such subsequent tracing stroke would not be parallel to that followed for the first stroke.

The output signals from the demodulators $X_{DEM}$, $Y_{DEM}$, $Z_{DEM}$ can also be applied directly or from recordings thereof to separate feed-drive mechanism, such for example as that illustrated in Fig. 9, for controlling the linear motion along three mutually perpendicular axes of a contouring machine which is to follow the movement of the tracing head and to this end may be arranged similarly to Fig. 4 with the tracing head 1 replaced by an appropriate tool. A contouring machine may however be arranged to follow the movements of the tracing head in any other manner, mechanically, electrically or otherwise.

It will be appreciated that in the foregoing description representative devices have been illustrated and the invention is intended to cover alternative devices which would produce the required result. For instance, the device S2 which requires both the primary and the secondary to be rotatable could be replaced by two such devices in which only the secondaries (or primaries) need to be rotatable.

What I claim is:

1. An arrangement for computing the total deflection of a deflectable stylus from the components of its deflection along three mutually perpendicular axes, which arrangement comprises, in combination, variable alternating current impedance means respectively responsive to said components of the stylus deflection, means for energizing in phase quadrature with each other said impedance means responsive to the components of stylus deflection along two of said axes thereby to obtain output signals in phase quadrature with each other and proportional to these components, means for algebraically adding said signals and for rectifying their sum, means for deriving from the rectified addition signal an A. C. signal of proportionate amplitude and reference phase, means for energizing in quadrature phase the impedance means responding to the component of stylus deflection along the third axis thereby to obtain an output signal of corresponding phase and of magnitude proportional to that component, and means for algebraically adding this latter output signal to said A. C. signal of reference phase whereby to obtain a resultant A. C. signal of amplitude proportional to the total deflection of the stylus.

2. An arrangement for computing the total deflection of a deflectable stylus from the components of its deflection along three mutually perpendicular axes, which arrangement comprises, in combination, variable alternating current impedance means respectively responsive to said components of the stylus deflection, means for energizing in phase quadrature with each other said impedance means responsive to the components of stylus deflection along two of said axes thereby to obtain output signals in phase quadrature with each other and proportional to these components, means for algebraically adding said signals and for rectifying their sum, means for deriving from the rectified addition signal and A. C. signal of proportionate amplitude and reference phase, means for energizing in quadrature phase the impedance means responsive to the component of stylus deflection along the third axis thereby to obtain an output signal of corresponding phase and of magnitude proportional to that component, means for adding this latter output signal to said A. C. signal of reference phase, and means for rectifying the signal resulting from this latter addition whereby to produce a D. C. signal of magnitude proportional to the total deflection of the stylus.

3. In combination, a tracing head, a stylus carried by the tracing head for engaging and tracing the surface of a model to be traced, said stylus being universally deflectable with respect to the tracing head, electric circuit components in said head respectively variable in accordance with deflections of the stylus along three mutually perpendicular axes, respective electric circuits containing said variable components and each adapted to produce, with a phase dependent on a voltage applied thereto, an output signal of amplitude controlled by its said variable component in proportion to the component of stylus deflection along the pertinent axis, means for applying a voltage of reference phase to one of said circuits and of quadrature phase to the other two circuits, means for algebraically adding the output from the circuit receiving the reference phase voltage and the output from one of the circuits receiving the quadrature phase voltage, means for rectifying the sum of these outputs, a modulator circuit providing from the rectified addition signal and the voltage of reference phase an A. C. signal of reference phase and of amplitude proportional to said rectified addition signal, means for adding this A. C. signal to the output from the remaining one of the circuits including said variable circuit components in the tracing head, and means for rectifying the resultant signal to provide a D. C. signal of amplitude proportional to the total deflection of the stylus.

References Cited in the file of this patent

UNITED STATES PATENTS 2,511,956   Wetzel _____ June 20, 1956

OTHER REFERENCES

Radio Electronics (Hindall et al.), Feb. 1951, pages 76 and 77.